United States Patent [19]
Okado et al.

[11] 3,952,787
[45] Apr. 27, 1976

[54] PUNCTURE-SEALING RUBBER COMPOSITION

[75] Inventors: Yosuke Okado; Hiroshi Fujikawa, both of Kodaira; Takashi Takusagawa, Ohme, all of Japan

[73] Assignee: Bridgestone Tire Company Limited, Tokyo, Japan

[22] Filed: Aug. 12, 1974

[21] Appl. No.: 496,688

Related U.S. Application Data
[63] Continuation of Ser. No. 388,666, Aug. 15, 1973, abandoned.

[30] Foreign Application Priority Data
Aug. 21, 1972 Japan.................................. 47-82796

[52] U.S. Cl.................................. 152/347; 428/912
[51] Int. Cl.²........................................ B60C 21/08
[58] Field of Search.............152/346–348, 310–314; 260/41 R, 41.5; 428/912

[56] References Cited
UNITED STATES PATENTS

| | | |
|---|---|---|
| 2,756,801 | 7/1956 | Iknayan et al. ..................... 152/347 |
| 2,776,699 | 1/1957 | Kindle et al. ....................... 152/347 |
| 3,048,509 | 8/1962 | Sweet et al. ........................ 152/347 |
| 3,361,698 | 1/1968 | Pace ................................... 152/347 |
| 3,378,512 | 4/1968 | Hamed et al. ..................... 260/33.6 |
| 3,514,417 | 5/1970 | Bickel et al. ............................ 260/27 |
| 3,565,151 | 2/1971 | Courtney ............................ 152/347 |
| 3,628,585 | 12/1971 | Pace ................................... 152/347 |

*Primary Examiner*—Drayton E. Hoffman
*Attorney, Agent, or Firm*—Sughrue, Rothwell, Mion, Zinn & Macpeak

[57] ABSTRACT

A rubber composition comprising a rubber containing a polymer of ethylene-propylene copolymer or ethylene-propylene-diene terpolymer, polybutene and an inorganic filler has an excellent puncture-sealing property. Tubeless tires provided with the rubber composition have a high resistance against the puncture.

4 Claims, 4 Drawing Figures

FIG_1 
FIG_2 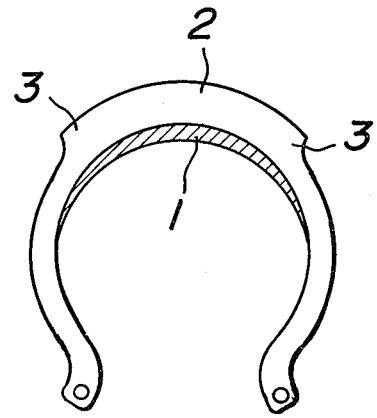
FIG_3 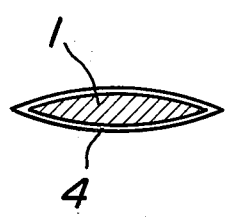
FIG_4 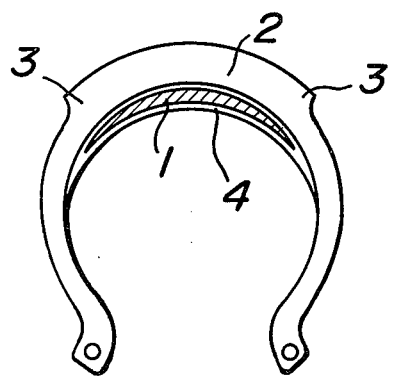

PUNCTURE-SEALING RUBBER COMPOSITION

This is a continuation of application Ser. No. 388,666, filed Aug. 15, 1973, now abandoned.

The present invention relates to an airtight rubber vessel, particularly to an improved puncture-sealing rubber composition to be used for tubeless tires.

Tubeless tires are generally considered to be relatively safe against the puncture, because even when a nail is penetrated through a tubeless tire, the nail does not easily come out and air does not leak rapidly. However, when a tubeless tire having a penetrated nail is run for a long period of time, particularly, at high speed, the nail is apt to come out due to the centrifugal force, and when the nail has once come out, air leaks rapidly. That is, the tire punctures and the running of the car is dangerous. Therefore, in order to keep a car safely, it is a very important problem to be solved that even when a nail penetrated through a tire has come out, the tire should be kept in a state that the tire is not substantially punctured. Methods for solving this problem have been disclosed, for example, by B.F. Goodrich Co. in Japanese Patent Application Publication No. 6,934/51 and No. 10,934/59. In these methods, a flexible rubber composition layer is stuck to the inner surface of a tubeless tire, and holes formed by coming out of penetrated nails are sealed by the rubber composition itself. However, this method is still insufficient in the sealing effect. The inventors have investigated to solve the drawbacks of the conventional methods and found that conventional puncture-sealing rubber compositions are poor in the puncture-sealing property due to their relatively poor tackiness, that when the compounding amount of oil is increased in order to improve the tackiness, the resulting rubber composition increase its fluidity and is apt to be deformed in the tire, and further the oil and rubber are separated from each other to deteriorate the puncture-sealing property during the use of the tire for a long period of time, and that the production and processing of such highly tacky composition are very difficult.

The object of the present invention is to provide a rubber composition having an improved puncture-sealing property, which can be easily produced and processed.

The inventors have noticed that ethylene-propylene copolymer rubber or ethylene-propylene-diene terpolymer rubber has a selective compatibility with polybutene, and applied this property in the production of tubeless tires, and as the result, the present invention has been accomplished. The improved puncture-sealing rubber composition according to the present invention comprises 100 parts by weight of a rubber containing at least 30% by weight of a polymer selected from the group consisting of ethylene-propylene copolymer and ethylene-propylene-diene terpolymer, from 50 to 500 parts by weight of polybutene, and from 5 to 700 parts by weight of an inorganic filler.

The kind of the ethylene-propylene-diene terpolymer to be used as a rubber component in the present invention is not particularly limited. However, terpolymers, which contain from 0.5 to 15% by weight of dicyclopentadiene, cyclopentadiene, 1,4-pentadiene, 2-methyl-1,4-pentadiene, ethylidenenorbornene, etc., as a diene component, are generally used.

In the present invention, a part of the ethylene-propylene copolymer rubber (hereinafter abbreviated as EPR) or ethylene-propylene-diene terpolymer rubber (hereinafter abbreviated as EPDM) to be used as a rubber component may be replaced by natural rubber (NR) or synthetic rubbers, such as polybutadiene rubber (BR), styrene-butadiene rubber (SBR), chloroprene rubber (CR), acrylonitrile-butadiene rubber (NBR) and isobutylene-isoprene rubber (IIR). However, when the amount of EPR or EPDM to be replaced by the above described rubbers is too large, the puncture-sealing property of the resulting rubber composition is deteriorated and the processing of the rubber composition is difficult. Therefore, a rubber containing at least 30% by weight, preferably at least 50% by weight, of EPR or EPDM should be used. Particularly, among the above described rubbers to be used for the replacement, natural rubber is superior to synthetic rubbers in the fluidity resistance and tackiness of the resulting puncture-sealing rubber composition.

As the polybutene to be compounded to the rubber component of the present invention, use is made of viscous liquid polybutene having a number average molecular weight of not more than 5,000, which is obtained by a polymerization of butenes, is usually used. However, polybutene having a number average molecular weight of at least 1,000 is preferably used in order to prevent the migration of polybutene into adjacent rubber layers in the carcass portion or inner liner portion, etc. of a tire. The amount of polybutene to be compounded is from 50 to 500 parts by weight, preferably from 100 to 400 parts by weight, based on 100 parts by weight of rubber.

The amount of the inorganic fillers to be compounded is from 5 to 700 parts by weight based on 100 parts by weight of rubber. However, in view of the puncture-sealing property of the resulting rubber composition, the amount is preferably from 25 to 300 parts by weight based on 100 parts by weight of rubber and from 30 to 70% by weight based on the amount of polybutene. As the inorganic filler, use is made of carbon black, calcium carbonate, magnesium carbonate, silica, zinc oxide and the like, which have an average particle diameter of less than 500 $\mu$ and are used for the production of conventional compounded rubber. Among them, carbon black and calcium carbonate are preferably used.

The puncture-sealing rubber composition according to the present invention may be compounded with a small amount of organic short cut fibers in order to improve the fluidity resistance, if necessary. Moreover, the rubber composition may be compounded with an antioxidant or may be slightly vulcanized by adding a vulcanizing agent without deteriorating the excellent properties.

The puncture-sealing rubber composition according to the present invention can be easily produced by mixing the above described ingredients by means of conventional rolls for rubber or other mixers, and the resulting rubber composition can be easily formed into sheets by means of conventional extruders.

For a better understanding of the invention, reference is taken to the accompanying drawings, wherein FIG. 1 is a cross-sectional view of a sheet of the puncture-sealing rubber composition according to the present invention, which has been produced by an extrusion molding;

FIG. 2 is a cross-sectional view of a tubeless tire, wherein the rubber composition sheet shown in FIG. 1 is directly stuck to the inner surface of the tubeless tire;

FIG. 3 is a cross-sectional view of a sheet of the puncture-sealing rubber composition according to the present invention, which has been wrapped with a protective rubber layer in the form of a sandwich; and FIG. 4 is a cross-sectional view of a tubeless tire wherein the laminated rubber sheet shown in FIG. 3 is stuck to the inner surface of the tubeless tire.

A sheet of the puncture-sealing rubber composition of the present invention, which has been obtained by the extrusion through an extruder has a cross-section, for example, as shown by the numeral 1 in FIG. 1. FIGS. 2 shows the simplest method for sticking the rubber composition sheet of the present invention to the inner surface of a tubeless tire. That is, the rubber composition sheet 1 is directly stuck to the inner surface of a vulcanized tubeless tire at the positions, which correspond to the whole tread portion 2, to the shoulder portions 3 and to a part of the side-wall portions. In this case, since the rubber composition according to the present invention has an excellent fluidity resistance, the rubber composition can stand long use without the use of a protective layer. Of course, the rubber composition sheet 1 may be previously wrapped with a protective rubber layer 4 to form a sandwich-like laminated sheet as shown in FIG. 3, and the laminated sheet may be stuck to the inner surface of a green tire, the ply of which has been already formed, as shown in FIG. 4, and then vulcanized together with the tire.

The above described rubber composition according to the present invention is remarkably excellent in the puncture-sealing property and can stand long use. Moreover, since the rubber composition can be produced and processed very easily, the rubber composition can be widely used in the tubeless tire and other airtight vessels.

The following examples are given for the purpose of illustration of this invention and are not intended as limitations thereof.

EXAMPLE 1

The puncture-sealing rubber composition of the present invention was compared with conventional puncture-sealing rubber compositions with respect to the puncture-sealing property. A tacky rubber composition, which was produced by compounding 100 parts by weight of EPDM (made by Sumitomo Kagaku Co., trademark: Esprene 501), 80 parts by weight of carbon black, 150 parts by weight of polybutene (made by Furukawa Kagaku Co., Trademark: HV-1,000, number average molecular weight of 1,500) and 2.5 parts by weight of nylon short cut fibers having a length of 2 to 4 mm by means of three rolls, each having a diameter of 4 inches, was extruded in a thickness of about 3.5 mm on a non-tacky sheet through a 2 inch type extruder. After the resulting rubber composition sheet was cooled, the sheet was directly stuck to the inner surface of a previously vulcanized belted tire (size: C78-14). For comparison, rubber compositions disclosed in the above described Japanese Patent Application Publication No. 6,934/51 and No. 10,934/59 were stuck to the same tires, which were Comparative Examples 1 and 2, respectively. The static puncture-sealing property and the dynamic puncture-sealing property of these rubber compositions were tested.

The static puncture-sealing property was measured as follows. Four kinds of iron nails, which had different diameters ranging from 1.8 to 3.8 mm and different lengths ranging from 32 to 90 mm, were used. A nail was hammered into a tire from the groove portion of the tread so that the nail would penetrate through the tire. After the tire was left to stand for 10 minutes, the nail was drawn out, and then the tire was left to stand for a predetermined period of time. In this test, seven tires were tested by one kind of nail and 28 tires were tested in total, and the number of tires, the inner pressure of which was completely reduced to atmospheric pressure, were counted.

The dynamic puncture-sealing property was measured as follows. An iron nail having a diameter of 2.7 mm and a length of 65 mm was hammered into a tire from the groove portion of the tread so that the nail would penetrate through the tire. The tire was firstly run at a speed of 80 Km/hr for 30 minutes on an iron drum, and then at a speed of 100 Km/hr. Then, the speed was increased by 20 Km/hr at intervals of 5 minutes until the nail came out due to the centrifugal force in such a manner that the tire was run at a speed of 100 Km/hr for 5 minutes, and then at a speed of 120 Km/hr for 5 minutes. In this test, all the nails came out at a speed of 120 to 160 Km/hr. Just after the nail had come out, the rotation of the drum was stopped, and the inner pressure of the tire was measured. In this test, seven tires were tested.

The following Table 1 shows the static and dynamic puncture-sealing properties of the rubber compositions in this Example 1 and Comparative Examples 1 and 2 together with their compounding recipes.

Table 1

|  | Example 1 | Comparative Example 1 | Comparative Example 2 |
| --- | --- | --- | --- |
| Compounding recipe (parts by weight) | | | |
| EPDM | 100 | — | — |
| SBR 1712 | — | 137.5 | — |
| Butyl rubber | — | — | 100 |
| Aromatic oil | — | 20 | — |
| Polybutene | 150 | 20 | 25 |
| Rosin | — | 18 | — |
| Tri-iron tetroxide | — | 60 | 50 |
| Carbon black | 80 | — | — |
| Zinc white | — | 3 | — |
| Phthalic anhydride | — | 5 | — |
| Antioxidant | — | 2 | 2 |
| Sulfur | — | — | 0.4 |
| Mercapto-benzothiazole | — | — | 0.4 |
| Short cut fibers | 2.5 | — | — |
| Result (number of punctured tires)* | | | |
| 1) Static test (total: 28 tires) | | | |
| After 5 minutes | 0 | 24 | 23 |
| After 24 hours | 0 | 28 | 28 |
| 2) Dynamic test (total: 7 tires) | | | |
| After 5 minutes | 0 | 6 | 7 |
| After 24 hours | 0 | 7 | 7 |

*In this Table 1 and the following Tables 2 and 3, the term "number of punctured tires" represents the number of tires, the inner pressure of which was completely reduced to atmospheric pressure.

As seen from Table 1, the puncture-sealing rubber composition according to the present invention is remarkably superior to conventional puncture-sealing rubber compositions in the puncture-sealing property.

EXAMPLES 2 to 7

Puncture-sealing rubber compositions containing different kinds of rubbers as shown in the following Table 2 were tested with respect to the extrusion processability and the puncture-sealing property. A puncture-sealing rubber composition was produced by compounding 100 parts by weight of the rubber, 150 parts by weight of polybutene (made by Furukawa Kagaku Co., trademark: HV-1000) and 50 parts by weight of carbon black by means of three rolls. The resulting rubber composition was extruded by means of a 2 inch type extruder. The extrusion processability was estimated by observing the state of extruded rubber composition with naked eye. In the production of a tubeless tire provided with the above obtained rubber composition, the extruded rubber composition was cooled, wrapped with a sheet of the same unvulcanized rubber as that used in the inner surface of the tire to form a sandwich-like laminated sheet, and the sheet was stuck to the inner surface of the tire on a former, and then vulcanized together with the tire.

The static and dynamic puncture-sealing properties of the rubber compositions were tested according to the methods described in Example 1. In the dynamic puncture-sealing property test in Examples 2 to 7, and Comparative Examples 3 to 7, all of the nails came out at a speed of 120 Km/hr due to the centrifugal force. The obtained results are shown in Table 2.

Table 2

| No. | Rubber | Extrusion* process-ability | Number of punctured tires Static test (total: 28 tires) | Dynamic test (total: 7 tires) |
|---|---|---|---|---|
| Example 2 | EPR | ● | 4 | 0 |
| Example 3 | EPDM | ● | 3 | 0 |
| Comparative Example 3 | SBR | x | 28 | 7 |
| Comparative Example 4 | BR | x | 28 | 7 |
| Comparative Example 5 | CR | x | 28 | 7 |
| Comparative Example 6 | NBR | x | 28 | 7 |
| Comparative Example 7 | NR | Δ | 28 | 7 |
| Example 4 | EPDM/NR=50/50 | ● | 2 | 0 |
| Example 5 | EPDM/NR=30/70 | Δ | 4 | 0 |
| Example 6 | EPDM/SBR=50/50 | o | 3 | 0 |
| Example 7 | EPDM/SBR=30/70 | Δ | 5 | 0 |

*Extrusion processability
● Very good
o Good
Δ Poor
x Very poor

As seen from Table 2, the puncture-sealing rubber compositions according to the present invention (Examples 2 to 7), in which EPR and EPDM are used, are superior in the extrusion processability and remarkably superior in the puncture-sealing property to the comparative rubber compositions, in which rubbers outside the scope of the present invention are used. Particularly, the rubber compositions shown in Examples 2 to 4 are remarkably excellent in both of the puncture-sealing property and extrusion processability.

EXAMPLES 8 to 13

A puncture-sealing rubber composition was prepared by compounding 100 parts by weight of a rubber composed of EPDM (Esprene 501) and natural rubber in a weight ratio of 60:40, 2.5 parts by weight of nylon short cut fibers, and polybutene (HV-1000) and calcium carbonate in amounts as shown in the following Table 3. The resulting rubber composition was stuck to the inner surface of a previously vulcanized bias tire (size: 6.95–14), and then the dynamic puncture-sealing property of the rubber composition was tested according to the method described in Example 1.

In Example 13, the rubber composition shown in Example 11 was further compounded with 0.5 part by weight of sulfur as a vulcanizing agent and 0.25 part by weight of diphenylguanidine and 0.5 part by weight of dibenzothiazole disulfide as an accelerator to prepare a puncture-sealing rubber composition, and the resulting rubber composition was stuck to the inner surface of an unvulcanized bias tire having the same size as described above, and then slightly vulcanized together with the tire.

The results of the test are shown in Table 3. As seen from Table 3, the rubber composition according to the present invention has a remarkably excellent puncture-sealing property.

Table 3

| No. | Polybutene** (parts) | Calcium** carbonate (parts) | Number of punctured tires (total: 7 tires) |
|---|---|---|---|
| Comparative Example 8 | 40 | — | 6 |
| Example 8 | 50 | 25 | 2 |
| Example 9 | 100 | 50 | 1 |
| Example 10 | 200 | 100 | 0 |
| Example 11 | 300 | 150 | 0 |
| Example 12 | 500 | 300 | 2 |
| Comparative Example 9 | 500 | 750 | 5 |
| Example 13* | 300 | 150 | 0 |

*Vulcanized at 149°C for 40 minutes
**Parts by weight per 100 parts by weight of rubber.

What is claimed is:

1. A tubeless tire carrying on the inner surface thereof a puncture-sealing rubber composition comprising
   1. 100 parts by weight of a rubber containing at least 30% by weight of a polymer selected from the group consisting of ethylene-propylene copolymer and ethylene-propylene-diene terpolymer, the remainder being at least one rubber selected from the group consisting of natural rubber, polybutadiene rubber, styrene-butadiene rubber, chloroprene rubber, acrylonitrilebutadiene rubber and isobutylene-isoprene rubber,
   2. from 50 to 500 parts by weight of polybutene having a number average molecular weight of from 1,000 to 5,000, and 3. from 5 to 700 parts by weight of an inorganic filler having an average particle diameter of less than 500 mm.

2. The tubeless tire as claimed in claim 1, wherein said rubber is a mixture of at least 50% by weight of a polymer selected from the group consisting of ethylene-propylene copolymer and ethylene-propylene-diene terpolymer and natural rubber.

3. The tubeless tire as claimed in claim 1, wherein the amount of said polybutene is from 100 to 400 parts by weight per 100 parts by weight of rubber.

4. The tubeless tire as claimed in claim 1, wherein said inorganic filler is a member selected from the group consisting of carbon black, calcium carbonate, magnesium carbonate, silica and zinc oxide.

* * * * *